Patented Dec. 19, 1922.

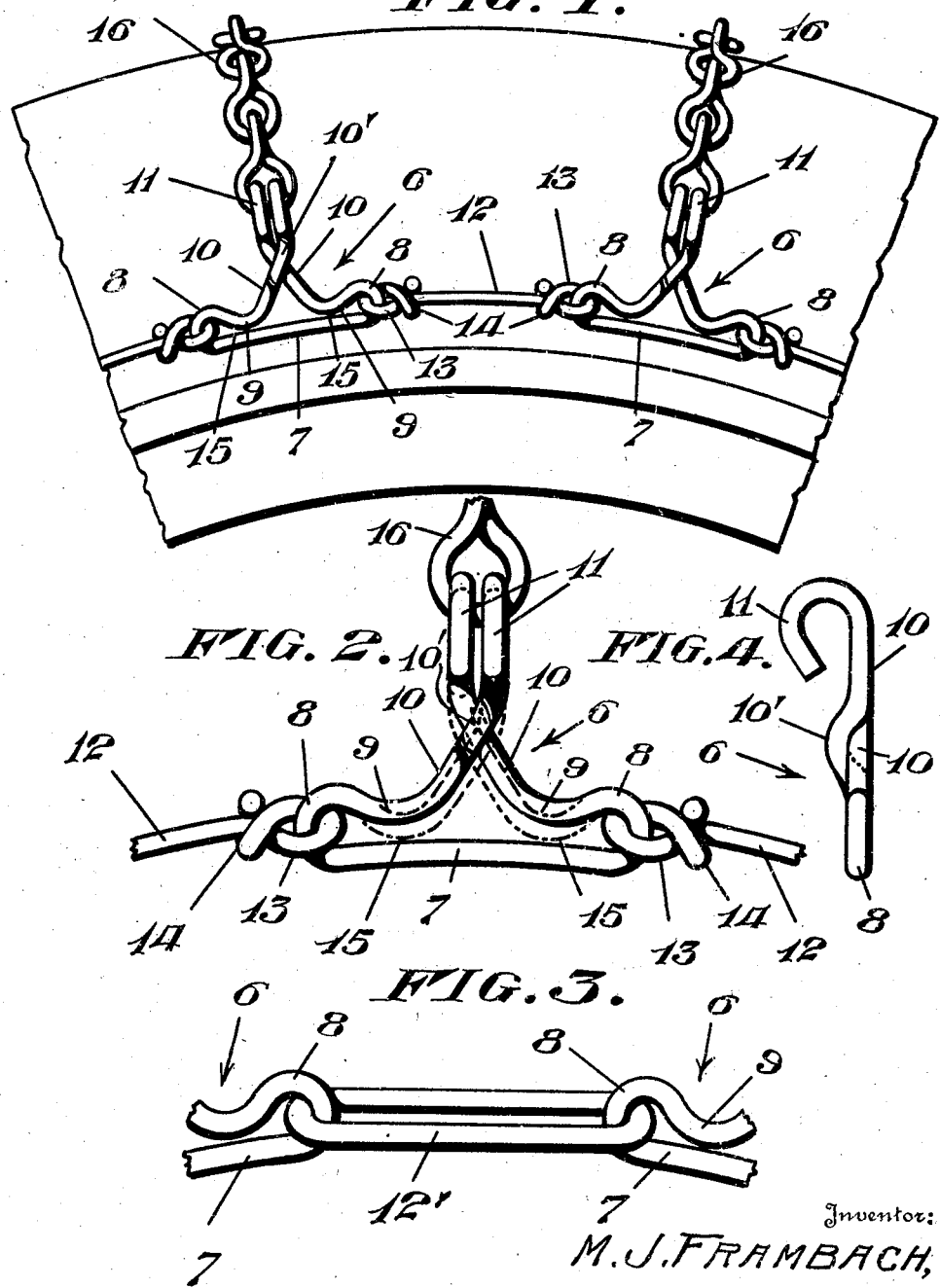

1,439,303

UNITED STATES PATENT OFFICE.

MATHEW J. FRAMBACH, OF HARTLEY, IOWA.

LINK FOR TIRE CHAINS.

Application filed March 3, 1922. Serial No. 540,716.

*To all whom it may concern:*

Be it known that I, MATHEW J. FRAMBACH, a citizen of the United States, residing at Hartley, in the county of O'Brien and State of Iowa, have invented certain new and useful Improvements in Links for Tire Chains; and I do hereby declare the following to be a full, clear, and exact description of the invention, such as will enable others skilled in the art to which it appertains to make and use the same.

The present invention relates to chains or non-skid devices for use upon the tires of vehicle wheels, for enhancing traction and preventing slipping, and an object of the invention is the provision of such a tire chain having links of novel and improved form in the longitudinal side retaining chains for the connection of the cross or tread chains, in order to afford a convenient assemblage of the links, to prevent the tangling thereof when handled or stored, and to prevent the links from opening up or pulling apart when the tire chain is subjected to considerable strain.

It is also an object of the invention to provide such a chain link for the connection of longitudinal and cross chains which is simple and inexpensive to manufacture and also practical and efficient in use.

With the foregoing and other objects in view, which will be apparent as the description proceeds, the invention resides in the formation of the link from a length of wire as hereinafter described and claimed, it being understood that changes can be made within the scope of what is claimed without departing from the spirit of the invention.

The invention is illustrated in the accompanying drawing, wherein—

Figure 1 is a fragmentary side elevation showing a portion of the chain on a tire.

Fig. 2 is an enlarged side elevation of one of the improved links showing same in full lines prior to final formation thereof, and in dotted lines the final form.

Fig. 3 is a fragmentary side elevation showing a modified form of alternate links of the longitudinal chains.

Fig. 4 is an end view of the improved link.

The present tire chain is similar, in general respects, to tire chains which are being used extensively, and consists, briefly stated, in a pair of longitudinal side retaining chains to be disposed at the opposite sides of the tire, and cross or transverse tread chains connected to the longitudinal chains to extend across the tire.

In carrying out the invention, the links 6 of the longitudinal chains to which the cross chains are connected, are of special formation. Each link 6 is bent from a rod or length of stout wire, and the link has an intermediate portion 7 which is preferably curved slightly with the center of curvature at the center or hub of the wheel. The portion 7 extends longitudinally of the longitudinal or side chain, and the wire is bent back at the ends of the portion 7 to provide the loops 8, from which the arms or portions 10 extend, which project away from the portion 7 and which also converge together. There are dents or reentrant bends 9 between the loops 8 and portions 10 extending toward the portion 7, and the terminals of the portions or arms 10 are the terminals of the rod or wire and are adapted to bear together side by side, said terminals being bent back to one side or outwardly to form hooks 11 disposed side by side. The portions 10 cross one another between the hooks 11 and the loops 8 and portion 7, one portion 10 being offset outwardly, as at 10' to extend across the other portion 10, and enabling the link to bear against the side wall of the tire without chafing same. The hooks 11 are located at that side of the link opposite to the side which is adapted to bear against the tire, and one of the arms 10 is adapted to bear substantially throughout its length against the tire at the side of the link which is disposed against the tire, while the other arm has the offset 10' bent away from the last named side of the link to cross the aforesaid arm. This arrangement will avoid the chafing of the tire and the side of the link which is presented to the tire does not have bends or kinks that would be liable to gouge into the tire.

The other or alternate links 12 of the each longitudinal or side chain, as shown in Figs. 1 and 2, have their end portions bent into eyes 13 and fastened by bending the terminals around the body portions, as at 14, to prevent such eyes from pulling open under the strains imposed on the links.

The links of each longitudinal chain are first assembled, and before assemblage, the throats 15 between the bends or dents 9 and portions 7 are of a width greater than the thickness or diameter of material from which the links are made, so that when the eyes 13 of the links 12 are slipped on the terminals of the links 6, said eyes can pass along the portions 10 and past the bends 9 to move into engagement with the loops 8. In placing the links 12 and moving them into engagement with the links 6, the terminals of the links 6 are spread apart, which is permitted by the resiliency or flexibility of the links, and the hooks 11 are normally open, as seen in Fig. 4, before assemblage.

After the links 6 and 12 are assembled, the dents or bends 9 are pressed or bent toward the portion 7 of each link 6, as indicated in dotted lines in Fig. 2, thereby closing the throats 15, and locking the eyes 13 in the loops 8, so that said eyes cannot move out of said loops. This will hold the links 6 and 12 in proper relative position, with flexible connections between them, and will avoid the tangling of the chain.

The terminal links of the cross chains 16 are readily engaged with the pairs of hooks 11 of the opposite side or longitudinal chains, and the hooks 11 are then bent toward the portions 10, for closing such hooks, and preventing accidental detachment of the links, although such hooks 11 can be unbent or opened to enable the cross chains to be removed and replaced when worn out.

Owing to the crossing of the portions or arms 10, it will be noted that the terminal hooks 11 in bearing against one another will resist any tendency for the link 6 to be pulled open by a tensile strain on the longitudinal chain. The tensile strain on the chain will have a tendency to separate the portions or arms 10, but said arms being crossed and having their terminals overlapped will cause the terminals to bear more tightly together, the greater the strain is. The intermediate portion 7 will take the strain without bending, such portion having no sharp bends, and extending substantially longitudinally of the side chain without being bent out of such longitudinal line.

The links 6 can also oscillate in the planes thereof when the chains 16 come into and move out of engagement with the road or pavement, for the creeping of the chain around the tire, and owing to such oscillation of the connecting links 6, such creeping of the chain around the tire is enhanced.

In Fig. 3 a coupling link 12' between the links 6 is shown which is of double strength, being more in the form of an ordinary chain link.

Having thus described the invention, what is claimed as new is:—

1. A link for a tire chain or the like to be disposed in a longitudinal chain for the connection of a cross chain, having an intermediate portion extending throughout its length longitudinally of the longitudinal chain, portions bent back from the ends of said intermediate portion and forming loops for the engagement of other links of the longitudinal chain, and arms extending from the loops and converging together and formed for the engagement of the cross chain, there being dents between said loops and arms pressed toward such intermediate portion to lock said other links in said loops.

2. A link for a tire chain or the like for connecting longitudinal and cross chains, having intermediate portion extending longitudinally of the longitudinal chain throughout its length, portions bent back from the ends of the intermediate portion and forming loops for the engagement of other links of the longitudinal chain, arms extending from said loops and converging together, the terminals of the arms being formed with hooks for the engagement of the cross chain, there being dents between said loops and arms pressed toward the intermediate portion to close the throats of said loops and lock the other links in said loops.

3. A chain link adapted to bear at one side against a tire and having an intermediate portion, loops at the ends of said portion for the engagement of other links, arms extending from said loops and converging together and crossing one another, and hooks at the terminals of the arms beyond the crossing point of the arms disposed side by side and adapted for the engagement of another chain link, said hooks being located at the side of the link opposite to the first named side, one of said arms being adapted to bear substantially throughout its length against the tire at the first named side of the link and the other arm being offset away from the first named side to cross the aforesaid arm.

4. A chain link having an intermediate portion, portions bent back from the ends of said intermediate portion and forming loops for the engagement of other links, and arms extending from the loops and converging together and crossing one another, said arms being formed for the engagement of a chain link, and their being dents between said loops and arms pressed toward said intermediate portion to lock said other links in said loops.

5. A chain link having an intermediate portion, portions bent back from the ends of the intermediate portion and forming loops for the engagement of other links, arms extending from said loops and converging together and crossing one another, the terminals of said arms being formed with hooks beyond the point of crossing to bear together and adapted for the engagement of a chain link, there being dents between said loops and arms pressed toward the intermediate portion to close the throats of said loops and lock said other links in said loops.

In testimony whereof I have signed my name to this specification in the presence of two subscribing witnesses.

MATHEW J. FRAMBACH.

Witnesses:
E. L. RANDOLPH,
ELMER NEEBEL.